United States Patent
Raghunathan et al.

(10) Patent No.: US 7,702,787 B1
(45) Date of Patent: Apr. 20, 2010

(54) CONFIGURABLE USER MANAGEMENT

(75) Inventors: Srikanthan Raghunathan, Bangalore (IN); Arati Pradhan, Bangalore (IN); John Thomas, Bangalore (IN); Kranthi K. Pachipala, Bangalore (IN); Michael H. Walther, Pleasanton, CA (US); Sachin B. Chaudhari, Oakland, CA (US)

(73) Assignee: EMC Corporation, Hopkinton, MA (US)

( * ) Notice: Subject to any disclaimer, the term of this patent is extended or adjusted under 35 U.S.C. 154(b) by 584 days.

(21) Appl. No.: 11/638,340

(22) Filed: Dec. 12, 2006

(51) Int. Cl.
*G06F 15/16* (2006.01)
*G06F 12/00* (2006.01)

(52) U.S. Cl. ........................ 709/225; 709/229

(58) Field of Classification Search ......... 709/225–229, 709/232, 250
See application file for complete search history.

(56) References Cited

U.S. PATENT DOCUMENTS

| 7,137,006 | B1 * | 11/2006 | Grandcolas et al. ......... 713/180 |
| 7,443,983 | B2 * | 10/2008 | Tanizawa et al. ............ 380/270 |
| 7,496,761 | B2 * | 2/2009 | Sonkin et al. ................ 713/182 |
| 2004/0243626 | A1 * | 12/2004 | Wyle et al. ................ 707/104.1 |
| 2005/0105122 | A1 * | 5/2005 | Sakai ........................ 358/1.14 |
| 2005/0188222 | A1 * | 8/2005 | Motsinger et al. ........... 713/201 |
| 2006/0193473 | A1 * | 8/2006 | Fu ............................. 380/277 |
| 2007/0050850 | A1 * | 3/2007 | Katoh et al. .................. 726/27 |
| 2007/0213033 | A1 * | 9/2007 | Alper et al. .................. 455/411 |
| 2008/0091948 | A1 * | 4/2008 | Hofmann et al. ............ 713/176 |

* cited by examiner

*Primary Examiner*—Zarni Maung
(74) *Attorney, Agent, or Firm*—Van Pelt, Yi & James LLP (57) ABSTRACT

Authenticating a user is disclosed. An indication that an application user wants to access a docbase is received. It is determined whether a user mapping or a principal login technique should be used. Accessing the docbase with a credential based at least in part on the determination is attempted.

21 Claims, 9 Drawing Sheets

CONFIGURABLE USER MANAGEMENT

BACKGROUND OF THE INVENTION

Enterprise portals typically seek to provide users with a single point of access to multiple resources such as information and services. For example, in a business setting, employees may use enterprise portals to manage inventory, track finances, and review procedures, all through a unified interface such as by directing a browser to an intranet site.

The resources provided via the portal are typically gathered from multiple locations (e.g., servers) that limit access to authorized users, and may include disparate systems. For example, inventory and customer lists may be stored in a business information database, while product manuals and sales reports are stored by another component, such as a document database, with each database requiring authentication before providing access to information. In some cases, different portal users may have different access (or no access) to some of those multiple resources. Such may be the case, for example, when two companies (with different schemas for issuing credentials to users) merge and desire to include information from both entities into a unified portal. Therefore, it would be desirable to have a better way to provide users with access to information.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process, an apparatus, a system, a composition of matter, a computer readable medium such as a computer readable storage medium or a computer network wherein program instructions are sent over optical or communication links. In this specification, these implementations, or any other form that the invention may take, may be referred to as techniques. A component such as a processor or a memory described as being configured to perform a task includes both a general component that is temporarily configured to perform the task at a given time or a specific component that is manufactured to perform the task. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Figure 1:
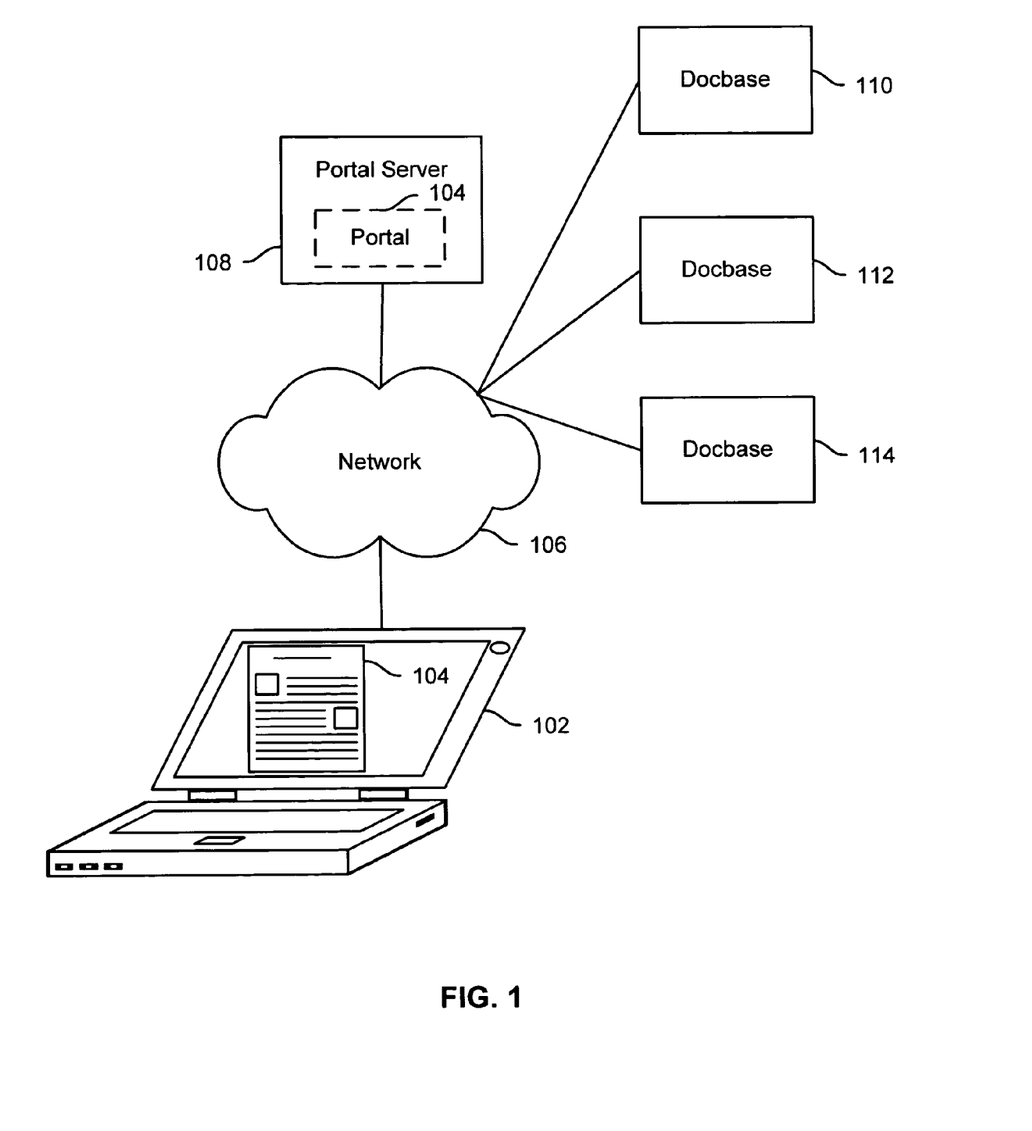
FIG. 1 illustrates an embodiment of a system for providing access to information.

FIG. 1 illustrates an embodiment of a system for providing access to information. In the example shown, client 102 accesses portal 104 via a browser, through network 106. Portal 104 is served by portal server 108 which draws content from a plurality of servers (also referred to herein as docbases) 110-114, also through network 106. In various embodiments, network 106 is the Internet, a local area network, a wide area network, a wired network, a wireless network, or any other network that can enable a user to access portal 104.

In some embodiments the docbases are of different types. For example, docbases can include business servers configured to store, for example, plant management, engineering management, and supply chain management information, as well as related information such as accounting information, customer records, etc. Docbases can also include document servers configured to store documents such as web pages, text files, multimedia files, and other content.

In the example shown, portal server 108 is an SAP Enterprise Portal server. Other portal servers, such as products made by Oracle and Siebel may be used and the techniques described herein adapted, as applicable. Docbase 110 includes EMC Documentum software. In various embodiments, docbases or components thereof (such as repositories or portions of repositories) are located on portal server 108.

As described in more detail below, a user (also referred to herein as "Alice") accesses portal 104 in part to interact with information provided by docbases such as docbases 110-114. For example, suppose Alice is a field engineer. Alice can use portal 104 to retrieve information such as project schedules (from docbase 110), design specifications (from docbase 112), and customer information (from docbase 114).

Alice's credentials for accessing the portal include a username ("alice.jones") and a password ("123asd$"). In various embodiments, other forms of credentials, such as smartcards and public key cryptography are used in addition to or instead of a username and password.

Alice's company has a standard naming convention that requires all of her computer accounts to use the same username—"alice.jones," though permitting users to have different passwords for different systems. Thus, Alice's account on docbase 110 is named "alice.jones" and has a password of "863hjd7" and her account on docbase 112 is also named "alice.jones" but has a password of "f92d82jhs78." In various embodiments, external user management systems such as LDAP servers may be used to maintain uniformly named accounts.

Configuring, or providing the ability to configure, a portal server and/or application such as portal 108 to use a non-user-specific password to log in to one or more docbases on behalf of a portal user is disclosed, a technique sometimes referred to herein as principal login. In some embodiments, each docbase has a non-user-specific credential (e.g., a superuser password or a public key) that, when provided by portal server 108, indicates to docbase 110 that access should be granted. For example, suppose docbase 110 has a superuser password of "XXju28s." An administrator configuring portal server 108 for use with docbase 110 would indicate that superuser password to portal 108. Subsequently, when Alice authenticates to portal 104 (logging in to the portal), when she needs information provided by docbase 110, portal server 108 provides docbase 110 with that docbase's superuser password and indicates that docbase 110 should grant access to Alice in scope commensurate with her having typed in her own name ("alice.jones") and docbase 110 password ("863hjd7"). Similarly, when another user, such as Bob (having a company username of "bob.smith" authenticates himself to the portal and requires access to information provided by docbase 110, instead of supplying Bob's docbase 110 password, portal server 108 would again supply the superuser password ("XXju28s.")

Figure 2:
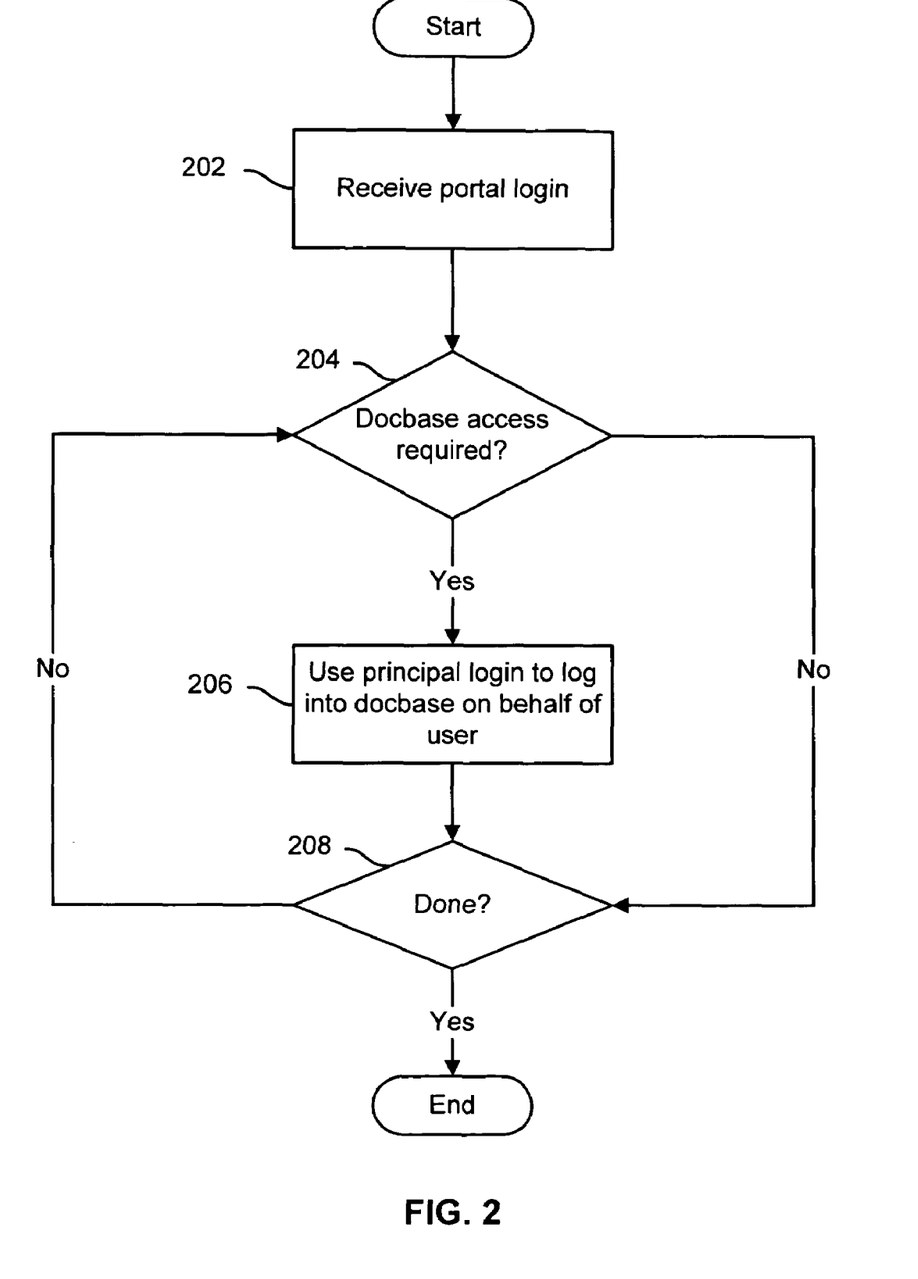
FIG. 2 is a flow chart illustrating an embodiment of a process for authenticating a portal user to a docbase using a principal login technique.

FIG. 2 is a flow chart illustrating an embodiment of a process for authenticating a portal user to a docbase using a principal login technique. In some embodiments the process of FIG. 2 is implemented by portal server 108. The process begins at 202 when a portal login is received. For example, at 202, Alice enters her username ("alice.jones") and her portal password ("123asd$") into a dialogue provided by portal 104, her credentials are verified, and a portal session is started.

At 204 it is determined whether Alice requires access to a docbase. For example, if Alice has a "start" page or summary page that lists upcoming milestones, that information may be obtained from docbase 110 and at 204 a determination that access to docbase 110 is required would be made, accordingly.

If access to a docbase is required, at 206, a principal login technique is used to authenticate the user to the docbase. For example, at 206 portal server 108 would provide docbase 110 with an instruction to "logon on behalf of alice.jones, password XXju28s." Similarly, if Bob authenticated himself to portal server 110 at 202, at 206 an instruction to "logon on behalf of bob.smith, password XXju28s" would be provided.

If access to multiple docbases is required (208) the process continues as applicable. In various embodiments Alice is automatically authenticated to all docbases configured to work with portal server 108. Such may be the case, for example, if the total number of docbases configured to work with portal server 108 is small. In such a case, portions of 204-208 may be combined or omitted as applicable.

Additionally, while the principal login technique is described herein as including the use of a superuser passphrase as a non-user-specific credential to log in on behalf of a specific user, in various embodiments, other non-user-specific credentials may be used instead of or in addition to a superuser passphrase, such as a digital certificate or public key.

Figure 3:
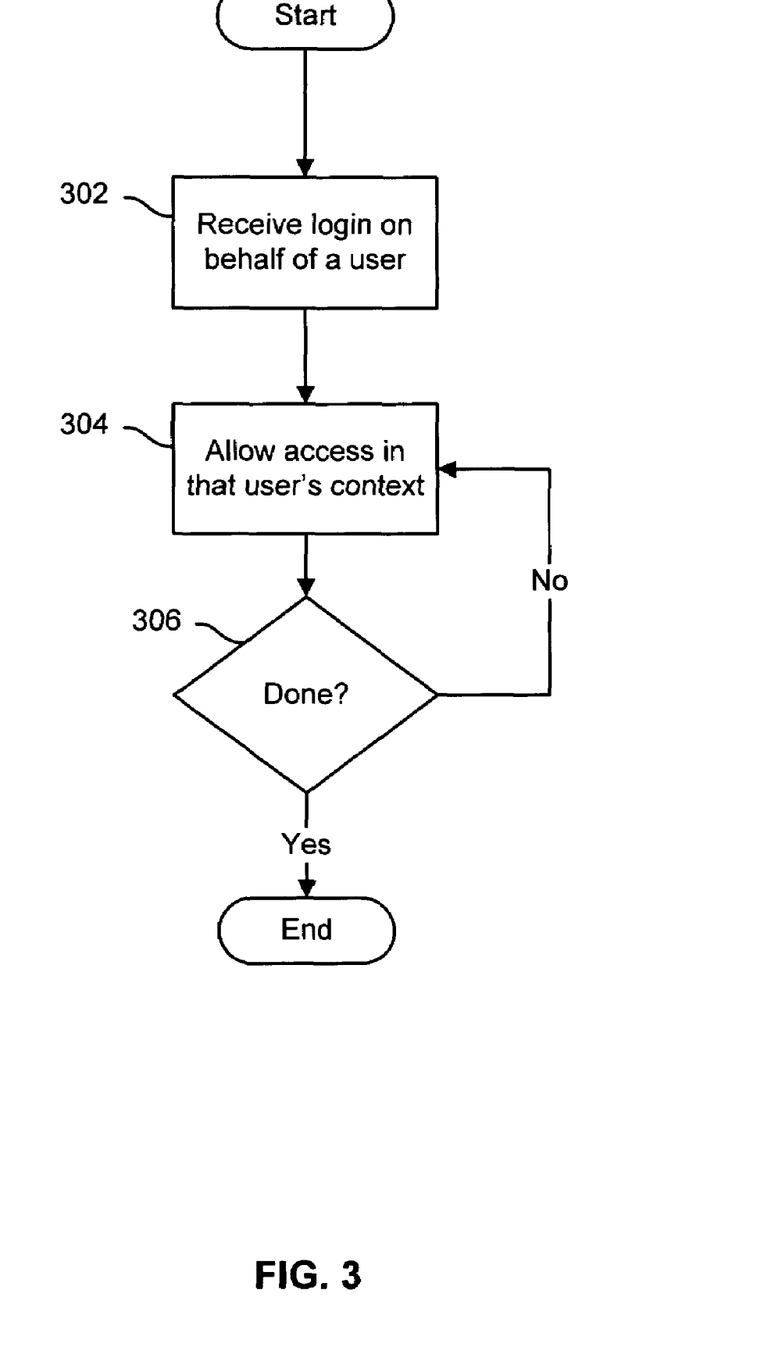
FIG. 3 is a flow chart illustrating an embodiment of a process for authenticating a portal user to a docbase using a principal login technique.

FIG. 3 is a flow chart illustrating an embodiment of a process for authenticating a portal user to a docbase using a principal login technique. In some embodiments the process of FIG. 3 is implemented by docbase 110. The process begins at 202 when a principal login request to permit a login on behalf of a user is received. For example, at 302, portal 108, provides docbase 110 with the superuser password and a request to permit Alice access to docbase 110.

At 304, if the credentials are confirmed, e.g., by docbase 110 verifying that the supplied superuser passphrase is correct, Alice is granted access to the resources of docbase 110 commensurate in scope with her account on docbase 110. For example, Alice may have the ability to read project schedule information but not to edit that information. At 304, Alice would be granted read access (via portal 104) to project schedule information on docbase 110 accordingly. In some embodiments, the scope of access granted to Alice is determined by Alice's association with one or more roles (e.g., junior engineer vs. director of sales) instead of in addition to access provided based on her account.

In some embodiments, Alice's access to the resources of docbase 110 is granted until she ends her session with portal 104 (such as when she selects a "logout" option). In other embodiments, Alice's access is limited in other ways, such as for a specified amount of time. Alice's access to docbase 110 terminates at 306 accordingly, as applicable.

Figure 4:
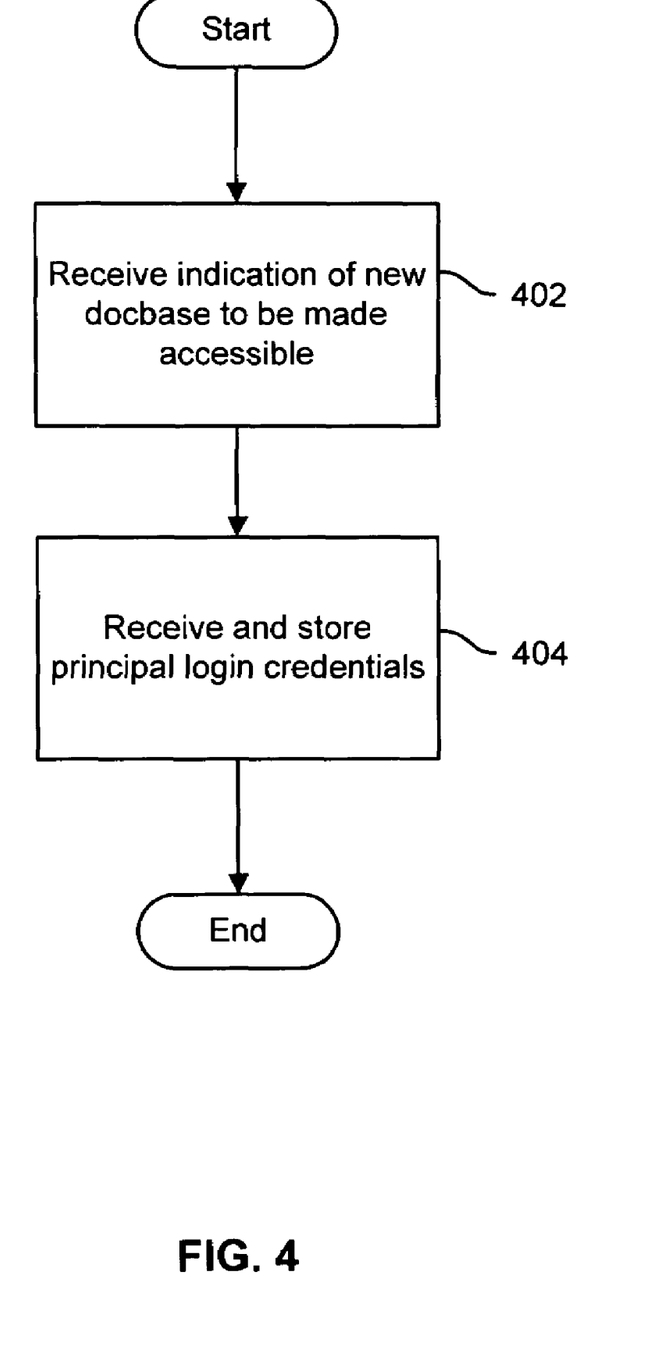
FIG. 4 is a flow chart illustrating an embodiment of a process for configuring a portal to authenticate users to a docbase using a principal login technique.

FIG. 4 is a flow chart illustrating an embodiment of a process for configuring a portal to authenticate users to a docbase using a principal login technique. In some embodiments the process of FIG. 4 is implemented by portal server 108. The process begins at 402 when an indication that a new docbase is to be included in the sources from which portal 104 composes information is received. For example, at 402 an administrator selects an "add support for a docbase" option in an administrative interface to portal server 108. In some cases, the docbase indicated at 402 is not "new" in the sense that it was recently purchased—the addition of a "new" docbase may also include the first time that portal server 108 is made aware of an existing docbase.

At 404, a principal login credential associated with the new docbase is received and stored. For example, at 404 an administrator enters a superuser password associated with docbase 110, such as "XXju28s" which is stored by portal server 108 for use in subsequent authentications on behalf of portal users (such as Alice and Bob) to docbase 110. In the event that the superuser password needs to be changed (e.g., due to password rotation policies), portion 404 may be repeated over time as applicable.

In some embodiments, Alice and Bob may also log in directly to docbase 110 using their individual (user specific passwords) in addition to accessing docbase 110 via portal 104.

User Mapping

In addition to principal login, portal server 108 can support the user mapping technique of authenticating portal users to one or more docbases. In a user mapping scenario, a user, such as Alice, is provided an interface into which she can enter and store for later use the username(s) and password(s) that she typically uses to authenticate herself to docbases.

For example, suppose Alice's company recently acquired another company ("Acme") and with it docbase 114. Acme's naming scheme for docbase 114 users is department, then first name. As such, Alice's username for docbase 114 is "FEAlice."

In a user mapping scenario, when Alice attempts to connect to docbase 114, portal server 108 determines Alice's username and password for docbase 114 (from the list that Alice created and keeps current) and passes that information along to docbase 114.

As described in more detail below, portal server 108 can be configured to access certain docbases (such as docbase 110 and 112) using principal login, while accessing other docbases (such as docbase 114) using user mapping.

Figure 5:
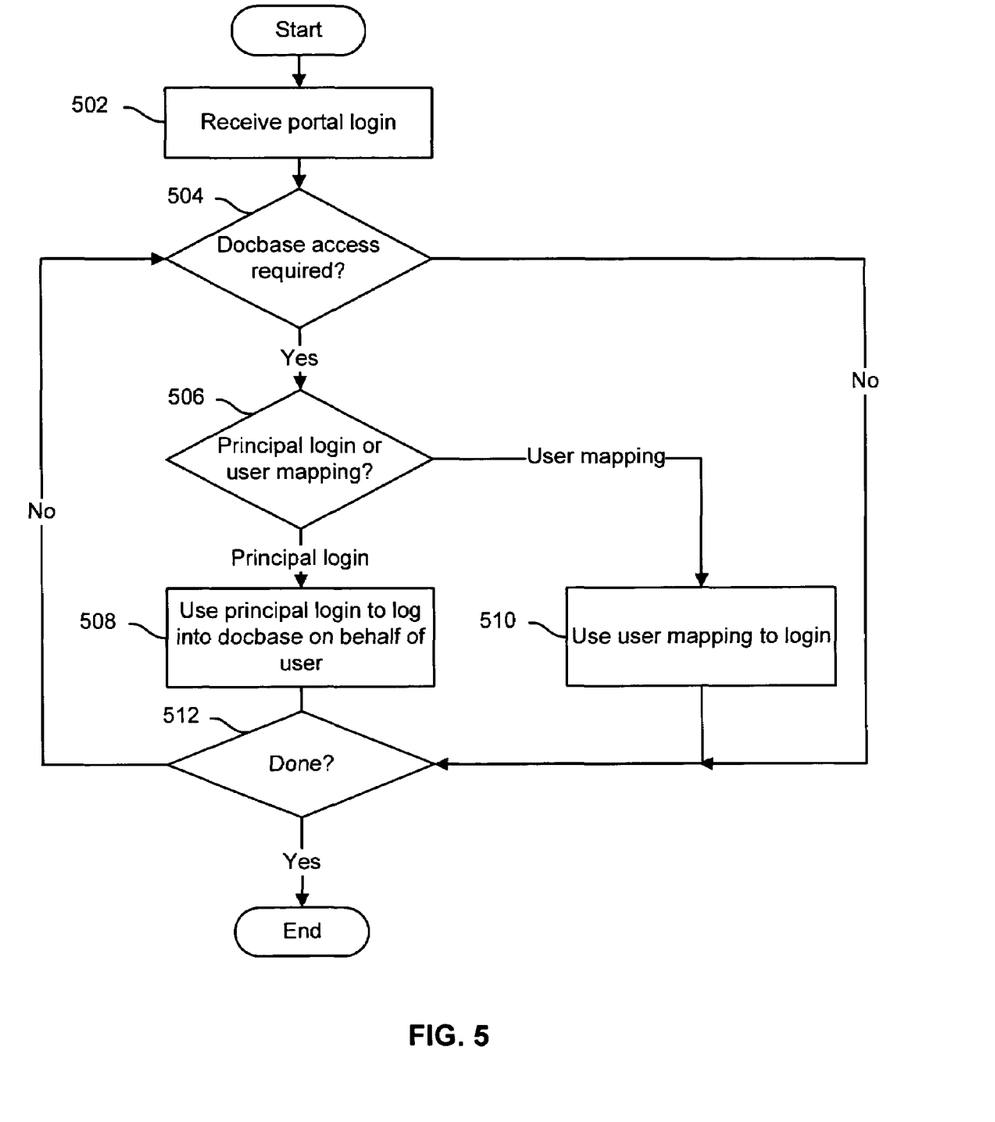
FIG. 5 is a flow chart illustrating an embodiment of a process for authenticating a portal user to a docbase.

FIG. 5 is a flow chart illustrating an embodiment of a process for authenticating a portal user to a docbase. In some embodiments the process of FIG. 5 is implemented by portal server 108. The process begins at 502 when a portal login is received. For example, at 502, Alice enters her username ("alice.jones") and her portal password ("123asd$") into a dialogue provided by portal 104, her credentials are verified, and a portal session is started.

At 504 it is determined whether Alice requires access to a docbase. For example, suppose that in addition to the list upcoming milestones (to be provided by docbase 110) on her summary page, Alice is given access to a list of customers for whom the field engineering group is currently performing work (to be provided by docbase 114). A determination that access to docbases 110 and 114 is required would be made, accordingly at 504.

If access to a docbase is required, at 506, it is determined whether a principal login technique or user mapping technique should be used to authenticate Alice to the docbase. For example, at 506 portal server 108 would determine that Alice should be authenticated by the portal to docbase 110 using principal login, while being authenticated to docbase 114 using user mapping.

At 508, Alice is authenticated to docbase 110 using principal login, while at 510, Alice is authenticated to docbase 114 using user mapping. Access is granted to additional docbases as applicable (512).

Figure 6:
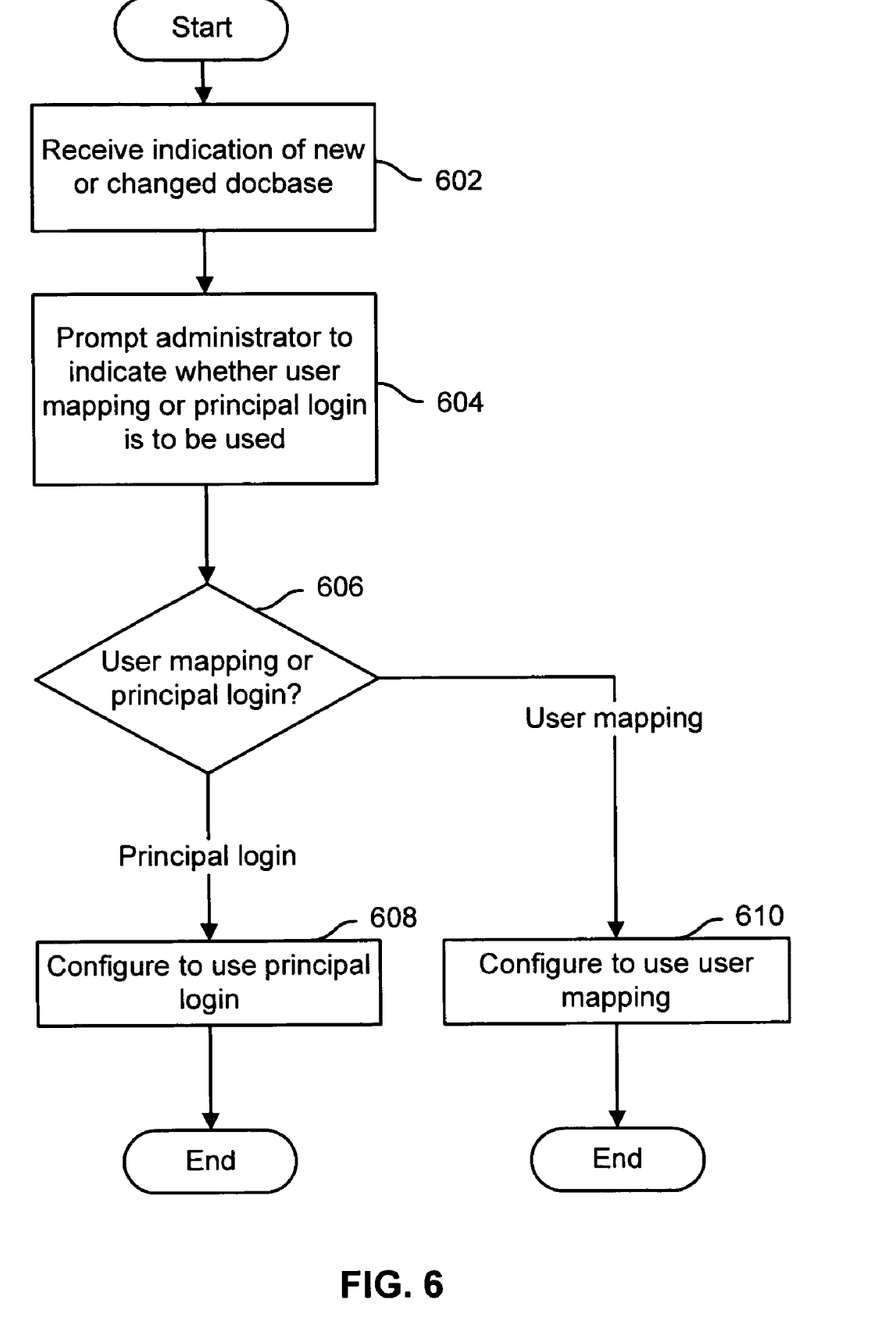
FIG. 6 is a flow chart illustrating an embodiment of a process for configuring a portal to authenticate users to a docbase using either the principal login or the user mapping technique.

FIG. 6 is a flow chart illustrating an embodiment of a process for configuring a portal to authenticate users to a docbase using either the principal login or the user mapping technique. In some embodiments the process of FIG. 6 is implemented by portal server 108. The process begins at 602 when an indication that a new docbase is to be included in the sources from which portal 104 composes information is received, or when an indication that the authentication setting for a docbase should be changed is received. For example, at 602 an administrator selects an "add support for a docbase" option in an administrative interface to portal server 108 or selects a "modify the authentication settings of a docbase" option. In some cases, the docbase indicated at 602 is not "new" in the sense that it was recently purchased—the addition of a "new" docbase may also include the first time that portal server 108 is made aware of an existing docbase, such as in the case where two companies or departments merge their assets.

At 604, an administrator, such as the one indicating the presence of a new docbase, is prompted to specify whether the principal login or user mapping authentication technique should be used in conjunction with authenticating users to that particular docbase. For example, at 604 an administrator may be presented with a radio button or dropdown selection option allowing the administrator to specify which technique to use with the docbase. At 606 it is determined which technique was specified.

If the administrator indicated that the principal login technique is to be used, at 608, the portal is configured to authenticate users requiring access to the docbase via the portal using the principal login technique. For example, the process described in conjunction with FIG. 4 may be used at 608. If the administrator indicated that a user mapping technique is to be used, at 610, the portal is configured to authenticate users requiring access to the docbase via the portal using the user mapping technique. As described above, in some cases an entity such as a company may have some docbases such as docbase 110 configured one way (e.g., principal login) while having other docbases such as docbase 114 configured the other way (e.g., user mapping). One reason for this is that the company may have legacy databases that predate the adoption of company-wide username conventions.

Figure 7:
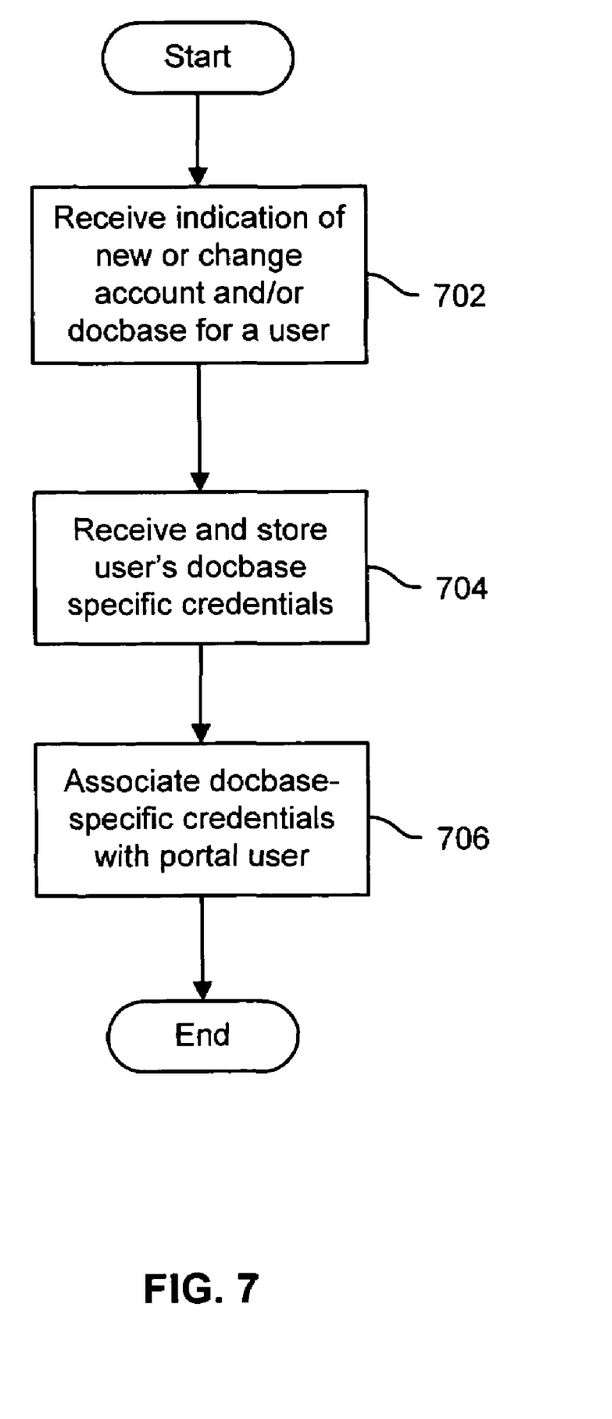
FIG. 7 is a flow chart illustrating an embodiment of a process for configuring a portal to authenticate a user to a docbase using a user mapping technique.

FIG. 7 is a flow chart illustrating an embodiment of a process for configuring a portal to authenticate a user to a docbase using a user mapping technique. In some embodiments the process of FIG. 7 is implemented by portal server 108. The process begins at 702 when an indication that user mapping is to be configured for a user is received. The process may be commenced a variety of ways, such as by an indication that a new portal user has been created, that an existing portal user wishes to make a change, and that a new docbase has been added. The first time that Alice logs into portal 104 after docbase 114 has been added, Alice may be presented with a prompt to configure user mapping access (e.g., specify the username and password to be used with docbase 114) at 702.

At 704, Alice's credentials (e.g., "FEAlice" and corresponding password) are received, such as through a dialogue interaction with Alice, and the received credentials are stored. For example, at 704, Alice's list of username(s) and password(s) is updated and at 706 the list is associated with "alice.jones" the portal user.

Configuring a Default

In some embodiments, in addition to permitting an administrator to specify whether principal login or user mapping should be used when authenticating a portal user to a docbase, the administrator may specify a default technique to try, optionally permitting the other technique to be tried if the user cannot be authenticated using the default technique. Such may be the case, for example, where most users on most docbases are believed to have a universal login (e.g., due to use of an LDAP server), however a small number of legacy servers, users with nonstandard names (e.g., including hyphens), etc. also exist.

Figure 8:
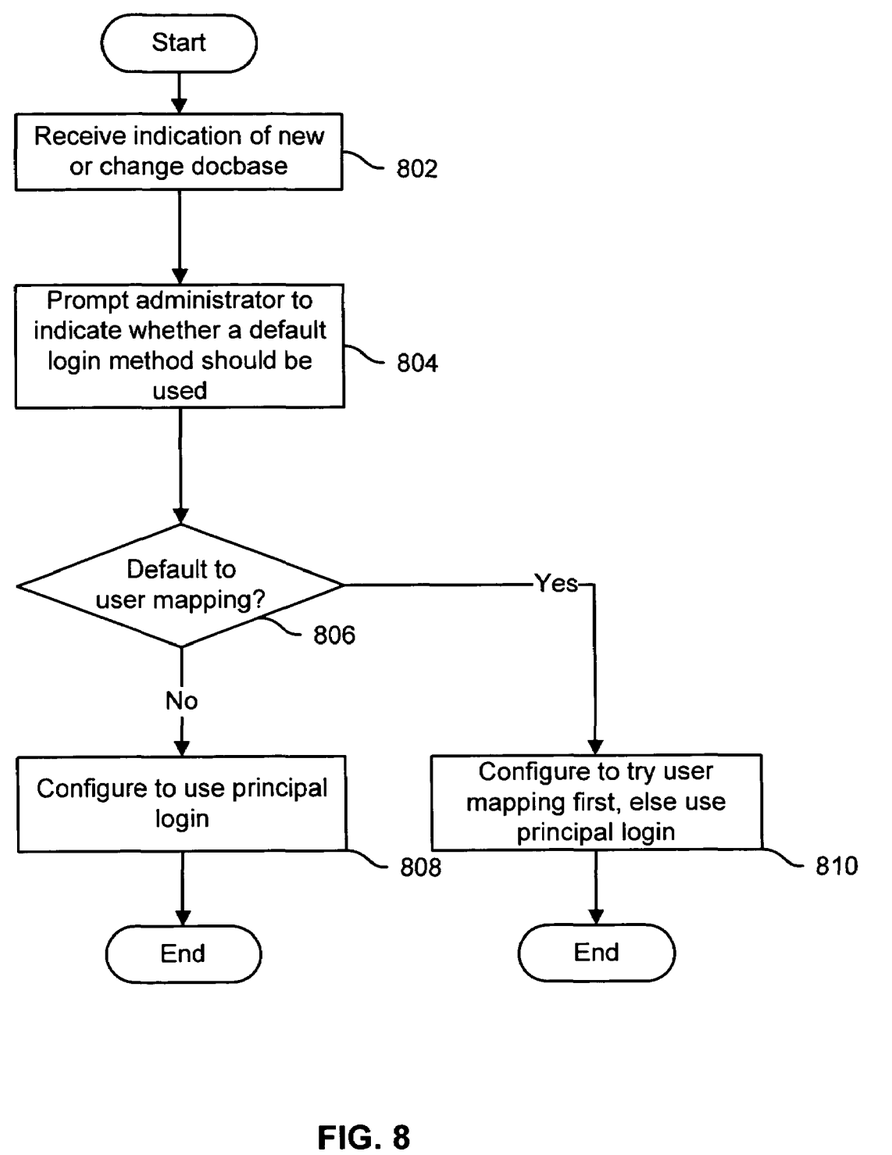
FIG. 8 is a flow chart illustrating an embodiment of a process for configuring a portal to authenticate users to a docbase using either the principal login or the user mapping technique.

FIG. 8 is a flow chart illustrating an embodiment of a process for configuring a portal to authenticate users to a docbase using either the principal login or the user mapping technique. In some embodiments the process of FIG. 8 is implemented by portal server 108. The process begins at 802 when an indication that a new docbase is to be included in the sources from which portal 104 composes information is received, or when an indication that the authentication setting for a docbase should be changed is received. For example, at 802 an administrator selects an "add support for a docbase" option in an administrative interface to portal server 108 or selects a "modify the authentication settings of a docbase" option. In some cases, the docbase indicated at 802 is not "new" in the sense that it was recently purchased—the addition of a "new" docbase may also include the first time that portal server 108 is made aware of an existing docbase, such as in the case where two companies or departments merge their assets.

At 804, an administrator, such as the one indicating the presence of a new docbase, is prompted to specify whether a default authentication technique (e.g., principal login or user mapping) should be used in conjunction with authenticating users to that particular docbase. For example, at 804 an administrator may be presented with a radio button or dropdown selection option allowing the administrator to specify whether to default to one technique and resort to the other technique in the event a user cannot be authenticated using the first technique. At 806 it is determined whether a default was specified.

If the administrator indicates that no default should be used, at 808, the portal is configured to authenticate users requiring access to the docbase via the portal only by using a single technique. If the administrator indicated that a default is to be set, at 810, the portal is configured to authenticate users requiring access to the docbase via the portal using the user mapping technique and in the event that fails, to attempt to authenticate users using principal login.

Figure 9:
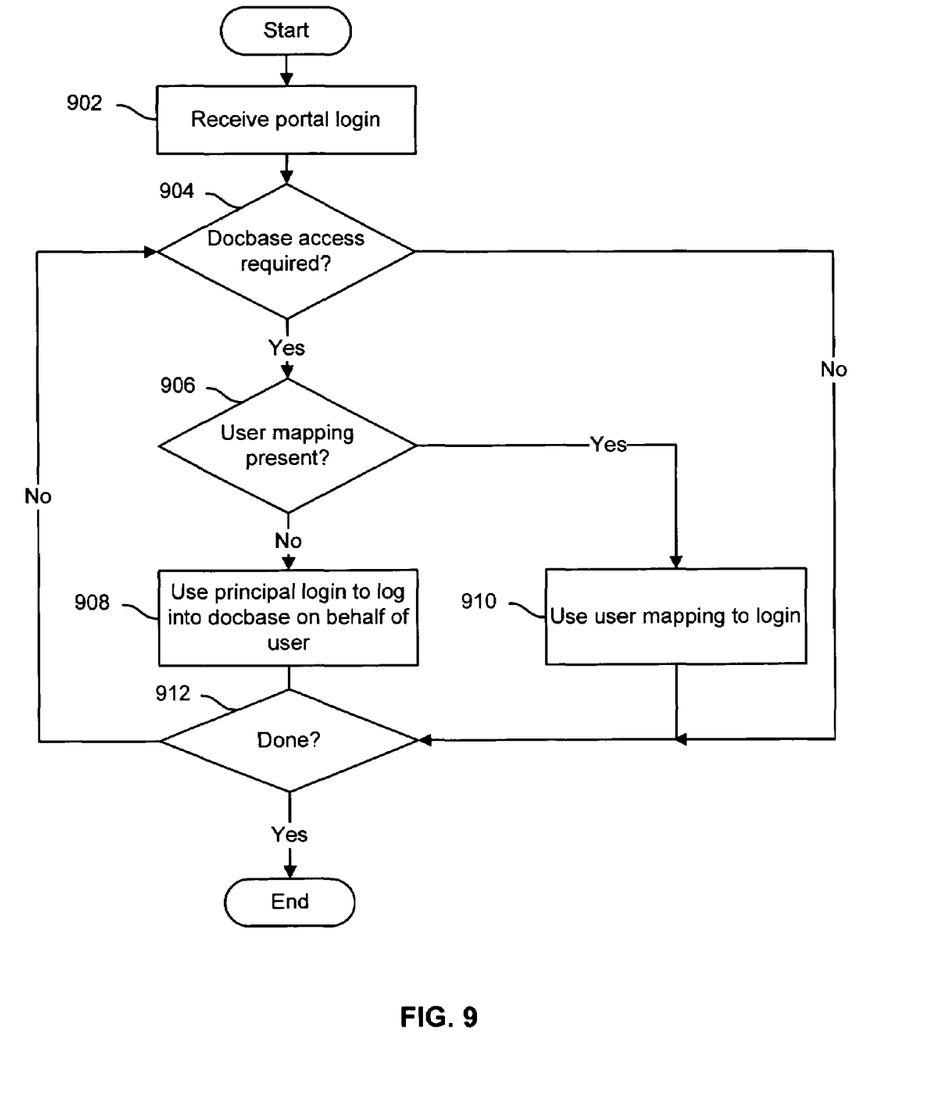
FIG. 9 is a flow chart illustrating an embodiment of a process for authenticating a portal user to a docbase.

FIG. 9 is a flow chart illustrating an embodiment of a process for authenticating a portal user to a docbase. In some embodiments the process of FIG. 9 is implemented by portal server 108. The process begins at 902 when a portal login is received. For example, at 902, Alice enters her username ("alice.jones") and her portal password ("123asd$") into a dialogue provided by portal 104, her credentials are verified, and a portal session is started.

At 904 it is determined whether Alice requires access to a docbase. If access to a docbase is required, at 906, it is determined whether there exists a user mapping associated with Alice that indicates a login and password that should be used to authenticate Alice to the docbase. For example, at 906 portal server 108 would evaluate Alice's list of usernames and passwords to determine if a set of credentials exists for the docbase. If so, at 910 the credentials are used to authenticate Alice to the docbase (using user mapping). If the attempts fails, or if no mapping exists, at 908 portal server 108 attempts to authenticate Alice to the docbase using principal login. Access is granted to additional docbases as applicable (912).

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method of authenticating a user comprising:
   receiving an indication that an application user wants to access a docbase;
   determining, using a processor, whether to use a user mapping or principal login technique in attempting to access the docbase; and
   attempting to access the docbase, using the processor, with a credential based at least in part on the determination, wherein:
      in the event it is determined to use user mapping, the credential includes authentication information that is specific to the application user; and
      in the event it is determined to use principal login, the credential includes non-user-specific authentication information.

2. The method of claim 1 wherein the application includes a portal.

3. The method of claim 2 wherein the docbase is one of a plurality of docbases, and wherein the portal is configured to use principal login to authenticate the user to a first docbase in the plurality of docbases and to use user mapping to authenticate the user to a second docbase in the plurality of docbases.

4. The method of claim 1 wherein the docbase is one of a plurality of docbases and the method further comprises receiving for each docbase an indication whether user mapping or principal login is to be used to attempt to access that docbase on behalf of portal users.

5. The method of claim 1 wherein the credential comprises a passphrase.

6. The method of claim 1 wherein the credential comprises a digital certificate.

7. The method of claim 1 wherein the credential comprises a public key.

8. A system for authenticating a user, including:
   a processor; and
   a memory coupled with the processor, wherein the memory is configured to provide the processor with instructions which when executed cause the processor to:
      receive an indication that an application user wants to access a docbase;
      determine whether to use a user mapping or principal login technique in attempting to access the docbase; and
      attempt to access the docbase with a credential based at least in part on the determination, wherein:
         in the event it is determined to use user mapping, the credential includes authentication information that is specific to the application user; and
         in the event it is determined to use principal login, the credential includes non-user-specific authentication information.

9. The system of claim 8 wherein the application includes a portal.

10. The system of claim 9 wherein the docbase is one of a plurality of docbases, and wherein the portal is configured to use principal login to authenticate the user to a first docbase in the plurality of docbases and to use user mapping to authenticate the user to a second docbase in the plurality of docbases.

11. The system of claim 8 wherein the docbase is one of a plurality of docbases and the method further comprises receiving for each docbase an indication whether user mapping or principal login is to be used to attempt to access that docbase on behalf of portal users.

12. The system of claim 8 wherein the credential comprises a passphrase.

13. The system of claim 8 wherein the credential comprises a digital certificate.

14. The system of claim 8 wherein the credential comprises a public key.

15. A computer program product for authenticating a user, the computer program product being embodied in a computer readable storage medium and comprising computer instructions which when executed by a computer cause the computer to:
   receiving an indication that an application user wants to access a docbase;
   determining whether to use a user mapping or principal login technique in attempting to access the docbase; and
   attempting to access the docbase with a credential based at least in part on the determination, wherein:
      in the event it is determined to use user mapping, the credential includes authentication information that is specific to the application user; and
      in the event it is determined to use principal login, the credential includes non-user-specific authentication information.

16. The computer program product of claim 15 wherein the application includes a portal.

17. The computer program product of claim 16 wherein the docbase is one of a plurality of docbases, and wherein the portal is configured to use principal login to authenticate the user to a first docbase in the plurality of docbases and to use user mapping to authenticate the user to a second docbase in the plurality of docbases.

18. The computer program product of claim 15 wherein the docbase is one of a plurality of docbases and the computer program product further comprises receiving for each docbase an indication whether user mapping or principal login is to be used to attempt to access that docbase on behalf of portal users.

19. The computer program product of claim 15 wherein the credential comprises a passphrase.

20. The computer program product of claim 15 wherein the credential comprises a digital certificate.

21. The computer program product of claim 15 wherein the credential comprises a public key.

* * * * *